United States Patent Office 3,042,478
Patented July 3, 1962

3,042,478
PROCESS OF DYEING AND PRINTING POLYETHYLENE GLYCOL TEREPHTHALATE FIBERS WITH DISPERSE DYESTUFFS
Ernest Merian, Bottmingen, and Curt Mueller, Basel, Switzerland, assignors to Sandoz Ltd., Basel, Switzerland
No Drawing. Filed Apr. 6, 1959, Ser. No. 804,096
Claims priority, application Switzerland Apr. 30, 1958
8 Claims. (Cl. 8—55)

The present invention relates to a process for the dyeing, padding and printing of polyester fibers with disperse dyestuffs, which consists in the use of dyestuffs of the formula

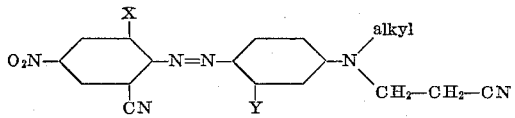

wherein X stands for hydrogen, chlorine or bromine, Y for hydrogen or methyl, and alkyl contains 1 to 4 carbon atoms.

The generic term polyester fibers chiefly refers to the condensation products of terephthalic acid and ethylene glycol which are marketed under the registered trade names "Terylene," "Dacrons," "Tergal," "Terital," "Trevira" and "Diolen."

Hitherto it has been virtually impossible to dye polyester fibers to bluish red and violet shades which are light-fast and at the same time fast to sublimation, steam pleating and heat setting.

The present process makes possible the production of dischargeable bluish red and violet dyeings which possess outstanding fastness to light, cross-dyeing, washing, water, sea water, perspiration, gas fumes, sublimation, heat setting and pleating. Espceially noteworthy and unexpected is the high light fastness, which in shades of only 1:25 of standard depth is many times better than that of closely related dyestuffs of only slightly different constitution.

These dyestuffs were not expected to be suitable for dyeing polyester fibers in fast-to-light shades because all the bluish red and violet commercial dyestuffs derived from 4-nitro-4'-dialkylamino-1.1'-azobenzenes have insufficient fastness to light on these fibers, although they are quite fast on secondary cellulose acetate. Other related acetate dyestuffs, e.g.

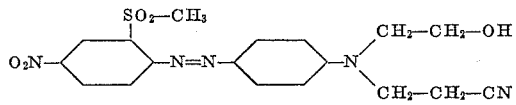

and

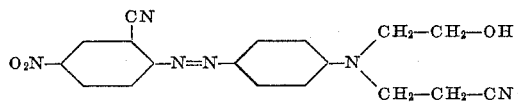

also show poor affinity for, and poor building-up properties on, polyester fibers. Especially there is no bluish red to violet dyestuff for polyester fibers in the trade which possesses at the same time good fastness to light and to sublimination.

The dyestuffs used in the process can be dyed, padded or printed in combination with each other or with other dyestuffs suitable for polyester fibers.

Dyeing is carried out by the known methods in presence of carriers at 80–100° C. or in absence of carriers with pressure at 100–140° C. Additions of dispersing agents, such as soap, the dry residue of sulfite waste liquor, sodium dinaphthylmethanedisulfonate, Turkey red oil, sodium cetylsulfate, sodium oleyloxy-ethanesulfonate, sodium oleylamino-ethanesulfonate and a condensation product of oleyl alcohol with ethylene oxide, can be of use. Printing and padding are best carried out in presence of suitable thickening agents with subsequent fixation at elevated temperature without steam, e.g. between 90° and 200° C., or with steam preferably at 100–150° C.

Suitable thickening agents for printing are alkali metal alginates, tragacanth, carob bean meal, carboxymethylcellulose, but especially gums such as Senegal gum, Arabic gum, British gum and in particular crystal gum, whereas for padding the alkali metal alginates are best suited.

In the following examples the parts are by weights and the temperatures in degrees centigrade.

EXAMPLE 1

7 parts of 4-nitro-2-cyano-6-chloro-2'-methyl-4'-(N-cyanoethyl - N - ethyl) - amino-1.1'-azobenzene (melting point 184°), 4 parts of sodium dinaphthylmethanedisulfonate, 4 parts of sodium cetyl sulfate and 5 parts of anhydrous sodium sulfate are ground to a fine powder in a ball mill over a period of 48 hours. 1 part of this dyeing preparation is mixed with a little water and the resulting dispersion is run through a sieve into a dyebath containing 2 parts of sodium lauryl sulfate in 4000 parts of water. In this instance the goods to liquor ratio is 1:40, but it may vary within wide limits.

100 parts of a scoured fabric of "Dacron" polyester fiber are introduced into the dyebath at 40–50°. The temperature is slowly increased and dyeing continued for 1–2 hours at 95–100° in presence of 20 parts of an emulsion of a chlorinated benzene in water. The fabric is removed, rinsed, soaped, rinsed and dried. It is dyed a violet shade which is fast to light, cross-dyeing, washing, water, sea water, perspiration, gas fumes, sublimation, heat setting, and pleating, and is white dischargeable.

EXAMPLE 2

10 parts of 4-nitro-2-cyano-4'-(N-cyanoethyl-N-ethyl)-amino-1.1'-azobenzene (melting point 145°), 10 parts of the dry residue of sulfite cellulose waste liquor and 80 parts of water are ground for 48 hours in a ball mill. The resulting paste is dried in a spry drier. 1 part of this dyeing preparation in 1000 parts of water is used for dyeing. This dyebath is heated to 40–50° and 100 parts of a scoured fabric of "Terylene" polyester fiber entered. The dyebath is heated slowly to 120–130° and dyeing continued for 30 minutes at this temperature under static pressure. The dyed fabric is subsequently rinsed, soaped, rinsed and dried. It is of a bluish red shade with similar properties to that of the dyeing with the dyestuff of Example 1.

The dyestuff used in this example has not been described to date. It can be produced, for example, on the following lines: 7 parts of finely powdered anhydrous sodium nitrite are added to 120 parts of concentrated sulfuric acid at 60–70° to give a nitrosyl sulfuric acid solution which is allowed to cool to 0–5°, at which temperature 16.3 parts of 1–amino-2-cyano-4-nitrobenzene are added. The reaction solution is stirred for 4 hours at 0–5° and then run carefully onto 400 parts of ice. A pale yellow, clear diazonium salt solution is obtained. 17.4 parts of N-ethyl-N-cyanoethylaminobenzene, dissolved in diluted hydrochloric acid, are slowly run into the solution with vigorous stirring at 0–5°. Formation of the dyestuff takes place immediately and the water-insoluble product is precipitated. On completion of coupling the dyestuff is isolated by filtration, the filter residue washed free of acid with water, and finally dried. The melting point in the crude state of the 4-nitro-2-cyano-4'-(N-cyanoethyl-N-ethyl)-amino-1.1' - azobenzene thus obtained is 130°. The pure product melts at 145°.

EXAMPLE 3

10 parts of 4-nitro-2-cyano-6-bromo-4'-(N-cyanoethyl-N-ethyl)-amino-1.1'-azobenzene (melting point 176°) in the form of the moist, undried filter press cake, 10 parts of Turkey red oil and sufficient water to bring the whole to 200 parts are mixed for 2 hours. Then 5 parts of the resulting paste and 5 parts of 2-hydroxy-1.1'-diphenyl are added to 2000 parts of water. In this dyebath 100 parts of a fabric of "Tergal" polyester fiber are entered at 40–50°, dyed for one hour at the boil, and subsequently rinsed. The violet dyeing is well penetrated and of outstanding color fastness.

EXAMPLE 4

7 parts of 4-nitro-2-cyano-4'-(N-cyanoethyl-N-ethyl)-amino-1.1'-azobenzene, 38 parts of sodium dinaphthyl-methanedisulfonate and 530 parts of water are ground for 48 hours in a ball mill. The colloidal solution thus obtained is mixed with 25 parts of butyl carbitol and 400 parts of 6% carboxymethylcellulose. This printing paste is very suitable for Vigoureux printing on slubbing of polyester fiber, e.g. "Diolen;" the slubbing is printed from two rollers (coverage 78%) and steamed at 115–120° without intermediate drying.

EXAMPLE 5

An aqueous, finely dispersed suspension of 17 parts of 4-nitro-2-cyano-4'-(N-cyanoethyl-N-ethyl)-amino-1.1'-azobenzene, 48 parts of sodium dinaphthylmethanedisulfonate, 25 parts of butyl carbitol in 50 parts of water are mixed with 500 parts of crystal gum, 1:2, 30 parts of glycerine and 320 parts of water. The resulting paste is printed in the normal way on a "Dacron" fabric, the dyestuff developed by steaming at 1.5 to 1.7 atmospheres pressure, and the print rinsed and dried. In this way sharp-edged bluish red prints with outstanding fastness properties are obtained. Similar results are obtained when the same dyestuff is dyed as described in Example 2 and the dying discharges, e.g. according to the method described in SVF-Fachorgan 11, 620–621 (1956).

EXAMPLE 6

A fabric of "Dacron" is impregnated on the pad with a cold liquid of the following composition:

10 parts of 4-nitro-2-cyano-4'-(N-cyanoethyl-N-ethyl)-amino-1.1'-azobenzene (M.P. 145°)
10 parts of sodium dinaphthylmethanedisulfonate
5 parts of sodium alginate
975 parts of water 1000 parts The applied dyestuff can be fixed by different methods as follows:

(a) The padded fabric, with or without intermediate drying, is steamed for about 5–10 minutes at 120° and 1.2 atmospheres, and subsequently rinsed and dried.

(b) The padded fabric is conditioned for 3 hours at 95° on the Pad-Roll dyeing machine, and then rinsed and dried.

(c) The padded fabric is dried and treated in dry heat at 200° for 2 minutes, after which it is washed and dried.

The obtained level bluish red dyeings process good fastness to light, cross-dyeing, washing, water, sea water, perspiration, gas fumes, sublimation, heat setting and pleating, and is white dischargeable.

In the following table are listed further dyestuffs, characterized by their melting points and shades on polyester fibers, which are suitable for dyeing, padding and printing these fibers by the methods described above.

Table

| X | Y | Alkyl | M.P., degrees | Shade |
|---|---|---|---|---|
| H | H | —$CH_3$ | 186 | Bluish red. |
| H | H | —$CH_2$—$CH_2$—$CH_3$ | 171 | Do. |
| H | H | —$CH_2$—$CH_2$—$CH_2$—$CH_3$ | 154 | Do. |
| H | $CH_3$ | —$CH_2$—$CH_3$ | 199 | Do. |
| Br | H | —$CH_3$ | 184 | Do. |
| Br | H | —$CH_2$—$CH_2$—$CH_3$ | 192 | Do. |
| Br | H | —$CH_2$—$CH_2$—$CH_2$—$CH_3$ | 181 | Do. |
| Br | $CH_3$ | —$CH_2$—$CH_3$ | 198 | Violet. |
| Cl | H | —$CH_3$ | 177 | Bluish red. |
| Cl | H | —$CH_2$—$CH_3$ | 181 | Do. |
| Cl | H | —$CH_2$—$CH_2$—$CH_3$ | 187 | Do. |
| Cl | H | —$CH_2$—$CH_2$—$CH_2$—$CH_3$ | 156 | Do. |

The process for their production consists in combining 1 mole of a 1-diazo-2-cyano-4-nitrobenzene which may be halogenated in the 6 position with 1 mole of a N-cyanoethyl-N-methyl or -N-ethyl- or -N-propyl- or -N-butyl-aminobenzene or 1-cyanoethyl-N-methyl- or -N-ethyl- or -N-propyl- or -N-butylamino-3-methylbenzene.

The coupling of the diazo compounds with the coupling components is carried out in an acid, preferably buffered, medium.

Having thus disclosed the invention what we claim is:

1. In a process for the dyeing of polyethylene glycol terephthalate fibers with disperse dyestuffs, the step of dyeing the fibers with dyestuff of the formula

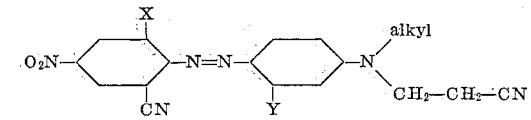

wherein
X represents a member selected from the group consisting of hydrogen, chlorine and bromine,
Y represents a member selected from the group consisting of hydrogen and methyl,
and the alkyl radical contains 1 to 4 carbon atoms.

2. The process step according to claim 1, wherein the dyeing is carried out in the presence of carriers at 80–100° C.

3. The process step according to claim 1, wherein the dyeing is carried out in the absence of carriers at 100–140° C. under pressure.

4. The process step according to claim 7, wherein the printing and the padding are carried out at room temperature in the presence of suitable thickening agents with subsequent fixation at elevated temperature.

5. A process according to claim 4, wherein the fixation is effected with steam at temperatures between 100 and 150° C.

6. A process according to claim 4, wherein the fixation is effected with dry heat at temperatures between 90 and 200° C.

7. In a process for padding polyethylene glycol terephthalate fibers with disperse dyestuffs, the step of padding the fibers with dyestuff of the formula

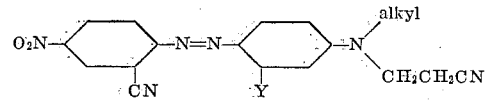

wherein X represents a member selected from the group consisting of hydrogen, chlorine and bromine, Y represents a member selected from the group consisting of hydrogen and methyl, and the alkyl radical contains 1 to 4 carbon atoms.

8. In a process for printing polyethylene glycol terephthalate fibers with disperse dyestuffs, the step of printing the fibers with dyestuff of the formula

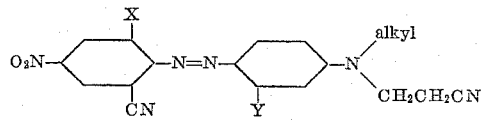

wherein X represents a member selected from the group consisting of hydrogen, chlorine and bromine, Y represents a member selected from the group consisting of hydrogen and methyl, and the alkyl radical contains 1 to 4 carbon atoms.

References Cited in the file of this patent

UNITED STATES PATENTS

| | | |
|---|---|---|
| 2,109,024 | Holzach | Feb. 22, 1938 |
| 2,782,187 | Sartori | Feb. 19, 1957 |
| 2,941,992 | Rhyner | June 21, 1960 |

FOREIGN PATENTS

| | | |
|---|---|---|
| 731,448 | Great Britain | June 8, 1955 |
| 1,014,519 | Germany | Aug. 29, 1957 |